(12) United States Patent
Yamada

(10) Patent No.: US 10,025,985 B2
(45) Date of Patent: Jul. 17, 2018

(54) INFORMATION PROCESSING APPARATUS, INFORMATION PROCESSING METHOD, AND NON-TRANSITORY COMPUTER-READABLE STORAGE MEDIUM STORING PROGRAM

(71) Applicant: Gurunavi, Inc., Tokyo (JP)

(72) Inventor: Atsushi Yamada, Tokyo (JP)

(73) Assignee: Gurunavi, Inc., Tokyo (JP)

( * ) Notice: Subject to any disclaimer, the term of this patent is extended or adjusted under 35 U.S.C. 154(b) by 0 days.

(21) Appl. No.: 15/406,254

(22) Filed: Jan. 13, 2017

(65) Prior Publication Data

US 2017/0200048 A1 Jul. 13, 2017

(30) Foreign Application Priority Data

Jan. 13, 2016 (JP) .................................... 2016-4058

(51) Int. Cl.
*G06K 9/00* (2006.01)
*G06T 11/60* (2006.01)
*G06T 19/00* (2011.01)
*G01C 21/00* (2006.01)

(52) U.S. Cl.
CPC ......... *G06K 9/00671* (2013.01); *G01C 21/00* (2013.01); *G06T 11/60* (2013.01); *G06T 19/006* (2013.01); *G06T 2207/30184* (2013.01)

(58) Field of Classification Search
None
See application file for complete search history.

(56) References Cited

FOREIGN PATENT DOCUMENTS

| JP | 2006-59136 | 3/2006 |
| JP | 2006-91390 | 4/2006 |
| JP | 2011-242816 | 12/2011 |

*Primary Examiner* — Michelle Chin
(74) *Attorney, Agent, or Firm* — Oblon, McClelland, Maier & Neustadt, L.L.P.

(57) ABSTRACT

An information processing apparatus includes: a storage that stores establishment information including identification information of an establishment, establishment position information indicating the position of the establishment, and level information indicating a level, on which the establishment is located, communication circuitry that receives, from a user terminal, a captured image captured, azimuth information, and terminal position information, and control circuitry that identifies at least one establishment existing in a building included in the received captured image based on the received terminal position information and azimuth information and the stored establishment position information, identifies the position of a level, on which the identified establishment exists, in the captured image based on the level information, and generates display information for displaying the identification information of the identified establishment on the position of the identified level of the captured image in a superimposed manner.

15 Claims, 7 Drawing Sheets

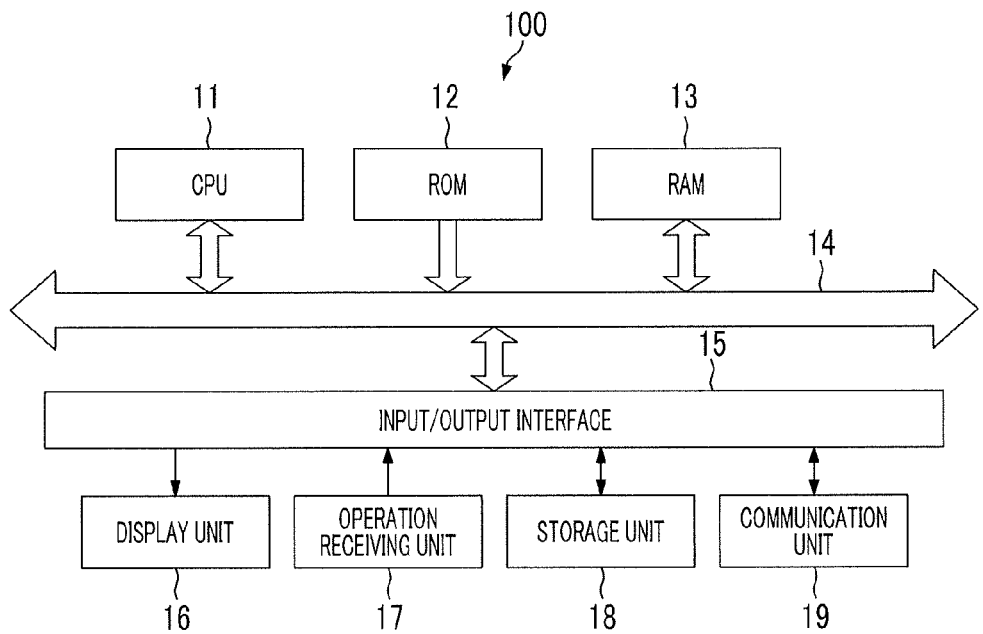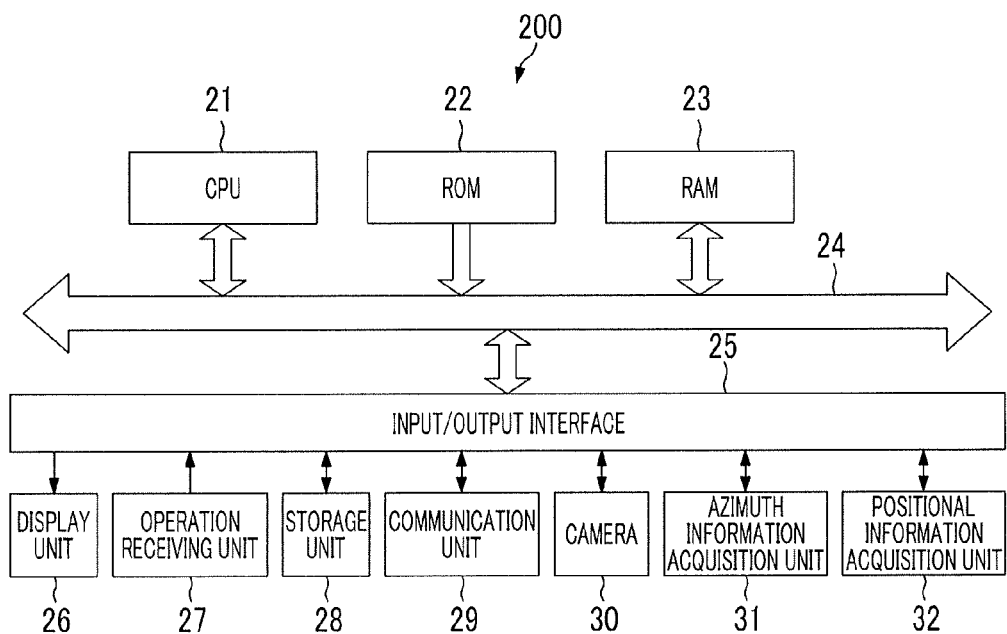

INFORMATION PROCESSING APPARATUS, INFORMATION PROCESSING METHOD, AND NON-TRANSITORY COMPUTER-READABLE STORAGE MEDIUM STORING PROGRAM

INCORPORATION BY REFERENCE

The disclosure of Japanese Patent Application No. 2016-4058, filed on Jan. 13, 2016 including the specification, drawings and abstract is incorporated herein by reference in its entirety.

BACKGROUND OF THE INVENTION

1. Field of the Invention

The present invention relates to an information processing apparatus, an information processing method, and a non-transitory computer-readable storage medium storing a program capable of providing information relating to restaurants.

2. Description of Related Art

There is an augmented reality (AR) technique that augments the sense of the reality by displaying contents of a virtual space in a reality space in a superimposed manner. The AR has already implemented in, for example, a smart phone or wearable devices, such as a head mount display (HMD) and or a see-through spectacles type.

For example, Japanese Patent Application Publication No. 2011-242816 (JP 2011-242816 A) describes a system in which a server ascertains an object, such as a building, included in a reality space captured by a portable terminal of a user, selects and reads a virtual display corresponding to the object from a database, and transmits the virtual display to the portable terminal of the user, and virtual display information is displayed on the captured reality space in a superimposed manner on the portable terminal of the user.

SUMMARY OF THE INVENTION

However, in the technique described in JP 2011-242816 A, while virtual display information corresponding to a captured image of a building can be superimposed on the captured image, in a building which has a plurality of stories (or floors) and in which different stores (or establishments) exist on each story, it is not possible to allow the user to easily ascertain whether or not the virtual display information is information of a floor on which an establishment exists.

The embodiments of the present disclosure provide an information processing apparatus, an information processing method, and a non-transitory computer-readable storage medium storing a program capable of, when AR displaying store information on a captured image of a building having a plurality of levels, allowing a user to easily ascertain a level to which the establishment information displayed in a superimposed manner corresponds.

A first aspect of the embodiments relates to an information processing apparatus. The information processing apparatus has a storage, communication circuitry, and a control circuitry. The storage is configured to store establishment information including identification information of a establishment, establishment position information indicating the position of the establishment, and level information indicating a level, on which the establishment is located, in a building, having a plurality of levels, in which the establishment exists. The communication circuitry is configured to receive, from a user terminal, a captured image captured by the user terminal, azimuth information indicating an azimuth of imaging, and terminal position information indicating the position of the user terminal. The control circuitry is configured to identify at least one establishment existing in a building included in the received captured image based on the received terminal position information and azimuth information and the stored establishment position information, identify the position of a level, on which the identified establishment exists, in the captured image based on the level information, and generate display information for displaying the identification information of the identified establishment on the position of the identified level of the captured image in a superimposed manner. The control circuitry is configured to perform control such that the communication circuitry transmits the generated display information to the user terminal.

According to the information processing apparatus of the above-described aspect, when AR displaying establishment identification information on the captured image of the building having a plurality of levels in a superimposed manner, it is possible to allow the user to easily ascertain the level of the building to which the establishment identification information displayed in a superimposed manner corresponds. The identification information of the establishment includes all information for identifying the establishment, for example, an establishment name, a genre, an image representing an appearance, a signboard, a representative menu, or the like of the establishment, but is not limited thereto.

A second aspect of the embodiments relates to a terminal apparatus. The terminal apparatus is a terminal apparatus mountable on a user, and has imaging circuitry, an azimuth sensor configured to acquire azimuth information indicating an imaging direction of the imaging circuitry, position acquisition circuitry configured to acquire terminal position information indicating the position of the terminal apparatus, communication circuitry configured to perform communication with a server apparatus, a display, and control circuitry. The control circuitry is configured to perform control such that the communication circuitry transmits a captured image captured by the imaging circuitry, the azimuth information acquired by the azimuth sensor, and the terminal position information acquired by the position acquisition circuitry to the server apparatus. The control circuitry is configured to perform control such that the communication circuitry receives display information for displaying identification information of an establishment identified as existing on a specific level of a building included in the captured image on the position of the specific level of the captured image in a superimposed manner based on the captured image, the azimuth information, and the terminal position information from the server apparatus. The control circuitry is configured to perform control such that the display displays the received display information on the captured image in a superimposed manner.

A third aspect of the embodiments relates to an information processing method. The information processing method includes storing establishment information including identification information of an establishment, establishment position information indicating the position of the establishment, and level information indicating a level, on which the establishment is located, in a building, having a plurality of levels, in which the establishment exists, receiving, from a user terminal, a captured image captured by the user terminal, azimuth information indicating an azimuth of imaging, and terminal position information indicating the position of the user terminal, identifying at least one establishment existing in a building included in the received captured image based on the received terminal position information and azimuth information and the stored establishment position information, identifying the position of a level, on which the identified establishment exists, in the captured image based on the level information, generating display information for displaying the identification information of the identified establishment on the position of the identified level of the captured image in a superimposed manner, and transmitting the generated display information to the user terminal.

A fourth aspect of the embodiments relates to a non-transitory computer-readable storage medium storing a program. The program causes an information processing apparatus to execute storing establishment information including identification information of an establishment, establishment position information indicating the position of the establishment, and level information indicating a level, on which the establishment is located, in a building, having a plurality of levels, in which the establishment exists, receiving, from a user terminal, a captured image captured by the user terminal, azimuth information indicating an azimuth of imaging, and terminal position information indicating the position of the user terminal, identifying at least one establishment existing in a building included in the received captured image based on the received terminal position information and azimuth information and the stored establishment position information, identifying the position of a level, on which the identified establishment exists, in the captured image based on the level information, generating display information for displaying the identification information of the identified establishment on the position of the identified level of the captured image in a superimposed manner, and transmitting the generated display information to the user terminal.

According to the above-described aspects, when AR displaying establishment information on a captured image of a building having a plurality of levels, it is possible to allow a user to easily ascertain a level to which the establishment information displayed in a superimposed manner corresponds. However, the effect is not intended to limit the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram showing a hardware configuration of a restaurant information providing server according to the embodiment of the invention;

FIG. 3 is a diagram showing a hardware configuration of a user terminal according to the embodiment of the invention;

DETAILED DESCRIPTION OF EMBODIMENTS

Figure 1:
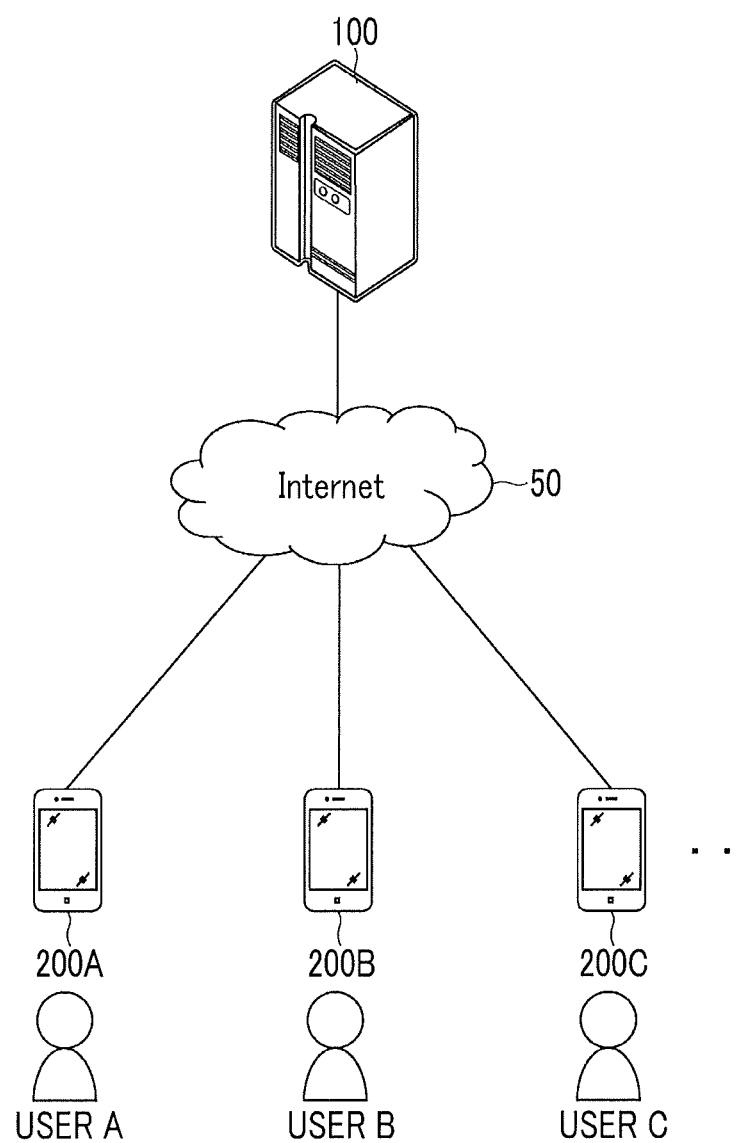
FIG. 1 is a diagram showing the configuration of a restaurant information providing system according to an embodiment of the invention.

Hereinafter, an embodiment of the invention will be described referring to the drawings.

[Configuration of System]

FIG. 1 is a diagram showing the configuration of a restaurant information providing system according to this embodiment.

As shown in the drawing, this system includes a restaurant information providing server 100 and a plurality of user terminals 200 on the Internet 50.

The restaurant information providing server 100 is a Web server which operates a portal site providing information relating to restaurants. The restaurant information providing server 100 is connected to a plurality of user terminals 200 through the Internet 50.

The restaurant information providing server 100 provides a search system of restaurant information for the user of each user terminal 200 in the portal site. Specifically, the restaurant information providing server 100 searches restaurant information conforming to a search condition based on a search request from the user terminal 200, generates a Web page providing a search result, and transmits the Web page to the user terminal 200.

In this embodiment, the restaurant information providing server 100 can receive a captured image, an azimuth, and terminal position information from the user terminal 200, can recognize a restaurant included in the captured image from these kinds of information, can generate AR information for displaying information relating to the restaurant on the captured image in a superimposed manner on the user terminals 200, and can transmit the AR information to the user terminal 200.

In particular, in this embodiment, the restaurant information providing server 100 can generate AR information for, in a case where the restaurant exists on a story (level or floor) of a building having a plurality of stories, visually ascertaining the story.

Each of the user terminals 200 (200A, 200B, 200C, and the like) is a terminal which is used by the user, and is, for example, a portable device, such as a smartphone, a tablet personal computer (PC), or a wearable terminal (head mount display, smart watch, or the like). Each of the user terminals 200 accesses the restaurant information providing server 100, receives the Web page, and displays the Web page on a screen by a browser or the like.

Each of the user terminals 200 can receive information relating to the restaurant included in the captured image by the user terminal 200 from the restaurant information providing server 100, and can display AR information in which the restaurant information is superimposed on the captured image.

[Hardware Configuration of Restaurant Information Providing Server]

FIG. 2 is a diagram showing a hardware configuration of the restaurant information providing server 100. As shown in the drawing, the restaurant information providing server 100 includes a central processing unit (CPU) 11, a read only memory (ROM) 12, a random access memory (RAM) 13, an input/output interface 15, and a bus 14 which connects these to one another.

The CPU 11 suitably accesses the RAM 13 or the like as necessary, and integrally controls all blocks of the restaurant information providing server 100 while performing various kinds of calculation processing. The ROM 12 is a nonvolatile memory which fixedly stores firmware, such as an OS and programs which are executed on the CPU 11 and various parameters. The RAM 13 is used as a working area or the like of the CPU 11 and temporarily stores the OS, various applications being executed, and various kinds of data being processed. The CPU 11 corresponds to a control unit (control circuitry) of the embodiments.

A display unit (display) 16, an operation receiving unit (operation receiving circuitry) 17, a storage unit (storage) 18, a communication unit (communication circuitry) 19, and the like are connected to the input/output interface 15.

The display unit 16 is, for example, a display device using a liquid crystal display (LCD), an organic electroluminescence display (OELD), a cathode ray tube (CRT), or the like.

The operation receiving unit 17 is, for example, a pointing device, such as a mouse, a keyboard, a touch panel, or other input devices. In a case where the operation receiving unit 17 is a touch panel, the touch panel can be integrated with the display unit 16.

The storage unit 18 is, for example, a nonvolatile memory, such as a hard disk drive (HDD), a flash memory (solid state drive (SSD)), or other solid state memories. The storage unit 18 stores the OS, various applications, and various kinds of data.

In this embodiment, the storage unit 18 has a restaurant information database, a map information database, and a building information database. Details will be described below.

The communication unit 19 is, for example, a network interface card (NIC) for Ethernet (Registered Trademark) or various modules for wireless communication, such as a wireless LAN, and performs communication processing with the user terminal 200.

[Hardware Configuration of User Terminal]

FIG. 3 is a diagram showing the hardware configuration of the user terminal 200. As shown in the drawing, the user terminal 200 includes a CPU 21, a ROM 22, a RAM 23, an input/output interface 25, and a bus 24 connecting these to one another.

The CPU 21 suitably accesses the RAM 13 or the like as necessary, and integrally controls all blocks of the user terminal 200 while performing various kinds of calculation processing. The ROM 22 is a nonvolatile memory which fixedly stores firmware, such as an OS and programs which are executed on the CPU 21 and various parameters. The RAM 23 is used as a working area or the like of the CPU 21 and temporarily the OS, various applications being executed, and various kinds of data being processed.

A display unit (display) 26, an operation receiving unit (operation receiving circuitry) 27, a storage unit (storage) 28, a communication unit (communication circuitry) 29, a camera 30, an azimuth information acquisition unit (azimuth information acquisition circuitry) 31, a positional information acquisition unit (positional information acquisition circuitry) 32, and the like are connected to the input/output interface 25.

The display unit 26 is, for example, a display device using a liquid crystal display (LCD), an organic electroluminescence display (OELD), a cathode ray tube (CRT), or the like.

The operation receiving unit 27 is typically constituted as a touch panel integrated with the display unit 26, but may be input devices, such as other buttons or keys.

The storage unit 28 is, for example, a nonvolatile memory, such as a flash memory or other solid state memories. The storage unit 28 stores the OS, various applications, and various kinds of data. In particular, in this embodiment, the storage unit 28 stores an application for displaying AR information received from the restaurant information providing server 100 on a captured image by the camera 30 in a superimposed manner and data necessary for executing the application.

The communication unit 29 is, for example, a wireless communication module corresponding to a mobile communication standard, such as 3rd generation (3G) or long term revolution (LTE), or a communication standard, such as a wireless local area network (LAN) including wireless fidelity (WiFi), and performs communication processing with the restaurant information providing server 100 or other user terminals.

The camera 30 captures a still image (photograph) and a motion image by, for example, an imaging element, such as a complementary metal oxide semiconductor (CMOS) or a charge coupled devices (CCD) sensor.

The azimuth information acquisition unit 31 has, for example, a magnetic sensor and an acceleration sensor. The magnetic sensor is capable of detecting the direction of a magnetic north when viewed from the user terminal 200. The acceleration sensor is capable of detecting a vertical (gravitational) direction. The azimuth (the angle of the camera 30) of the user terminal 200 is calculated from the detected direction of the magnetic north and the vertical direction.

The positional information acquisition unit 32 is constituted as, for example, a GPS sensor, captures radio waves from three or more satellites, calculates coordinates in which the position of the user terminal 200 is described in a terrestrial coordinate system based on the distance to each satellite, and applies the coordinates to a terrestrial ellipsoid to detect positional information (latitude/longitude/elevation information) of the user terminal 200.

[Database Configuration of Restaurant Information Providing Server]

Figure 4:
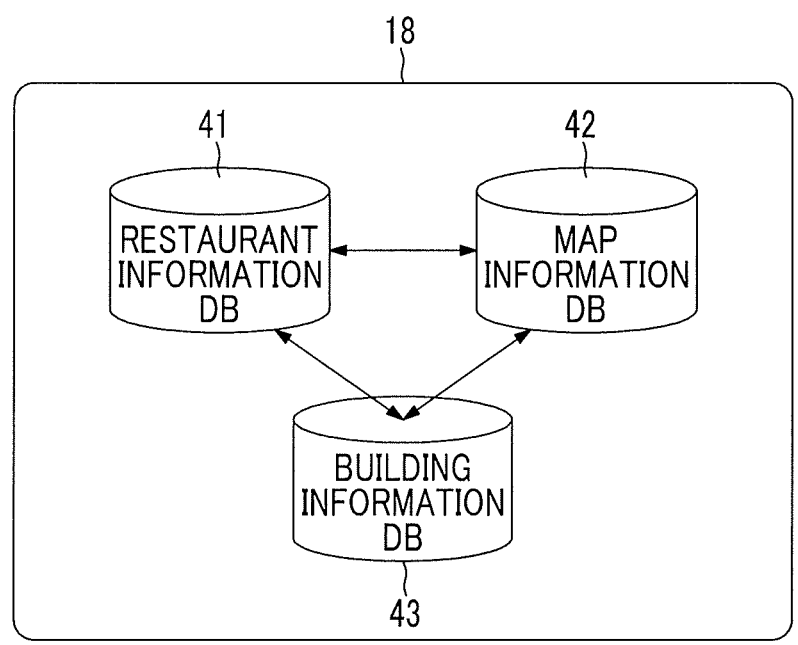
FIG. 4 is a diagram showing the configuration of a database in the restaurant information providing server according to the embodiment of the invention.

FIG. 4 is a diagram showing the configuration of each database provided in the restaurant information providing server 100.

As shown in the drawing, the restaurant information providing server 100 has a restaurant information database 41, a map information database 42, and a building information database 43 in the storage unit 18.

The restaurant information database 41 stores, for each restaurant, business condition/service genre (category) information of the restaurant and contents for introducing the restaurant, that is, information indicating the features of the store, such as a an PR advertisement of the store, event information relating to the events of the restaurant, area information relating to an area where the restaurant is located, the address and the telephone number of the restaurant, image data relating to the restaurant (for introducing the restaurant), menu information relating to a menu of the restaurant, business hours, and information relating to a website URL, in addition to the name and location information (latitude/longitude information or address information, story information) of the restaurant, and an ID (store ID) for identifying the restaurant. The AR information which is transmitted to the user terminal 200 is generated by at least a part of these kinds of information.

The map information database 42 stores map information including the position (latitude/longitude/elevation) of a building, such as a building where the restaurant exists.

The building information database 43 stores, for each building existing inside the map information, story information (the number of stories above ground and the number of underground stories of each building), information relating to the height of each building from the ground, information relating to the height of each story from the ground, and building compartment information relating to compartments on each story. In the building compartment information, information relating to a store (a restaurant or the like) located in each compartment is also stored in association with the position of each compartment.

These databases are mutually referred to and used as necessary in restaurant information providing processing in the restaurant information providing server 100 described below.

[Operation of Restaurant Information Providing Server]

Next, the operation of the restaurant information providing server 100 configured as above will be described. The operation of the restaurant information providing server 100 is executed by cooperation of hardware, such as the CPU 11 and the communication unit 19, and software stored in the storage unit 18. In the following description, for convenience, the CPU 11 is the subject of operation.

Figure 5:
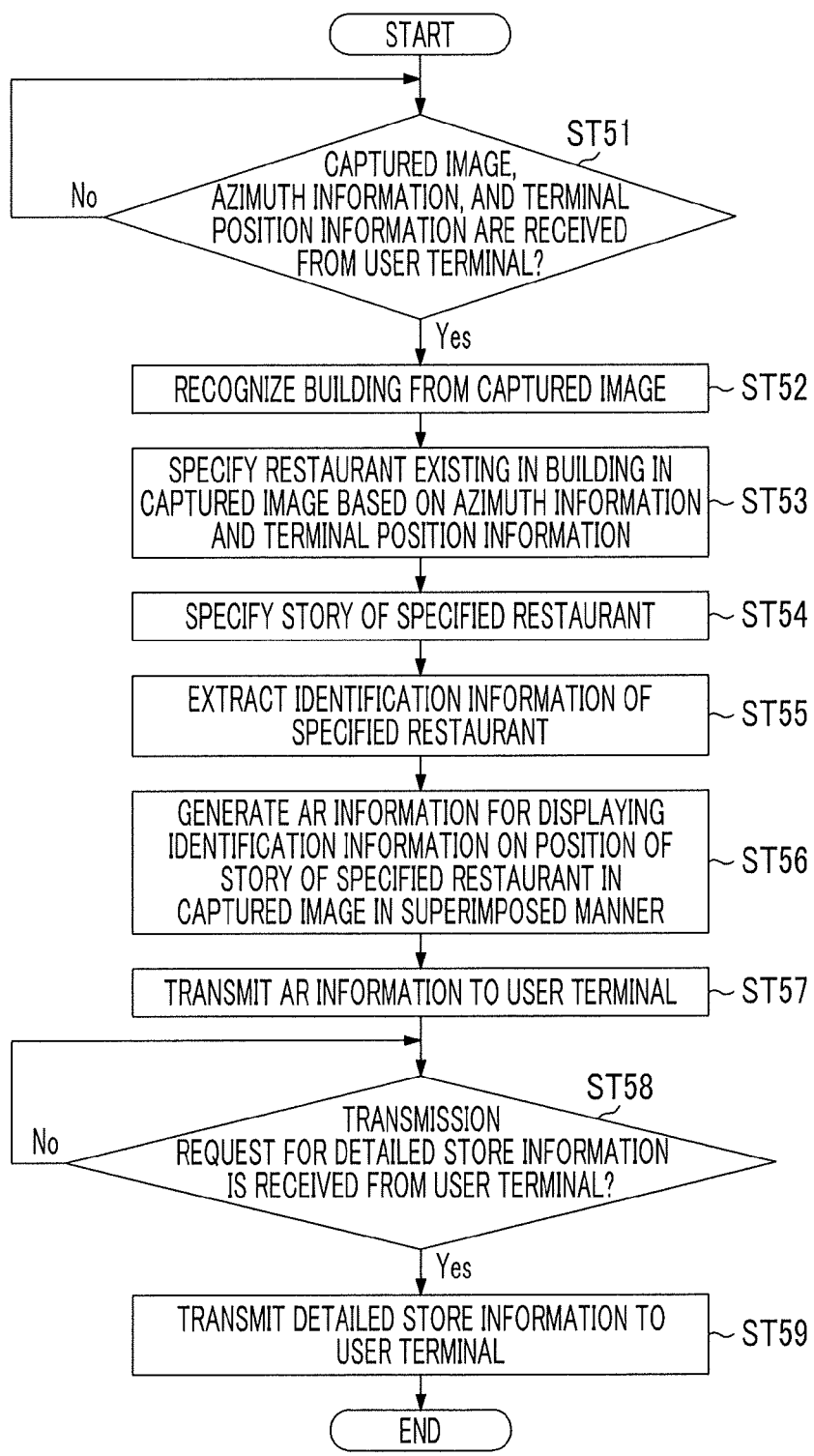
FIG. 5 is a flowchart showing the flow of restaurant information providing processing by the restaurant information providing server according to the embodiment of the invention.

FIG. 5 is a flowchart showing a flow of restaurant information providing processing by the restaurant information providing server 100.

As shown in the drawing, the CPU 11 of the restaurant information providing server 100 first determines whether or not a captured image captured by the camera 30 of the user terminal 200 and azimuth information and terminal position information acquired in the user terminal 200 at the time of imaging are received from the user terminal 200 (Step 51).

In a case where the CPU 11 determines that the captured image, the azimuth information, and the terminal position information are received (Yes), the CPU 11 recognizes a building from the captured image (Step 52). In the recognition of the building, for example, conventional techniques, such as edge extraction, feature point extraction, and pattern matching, are used.

Subsequently, the CPU 11 identifies a restaurant existing in the building recognized from the captured image based on the azimuth information and the terminal position information (Step 53). Specifically, the CPU 11 identifies the position (latitude/longitude) of the recognized building based on the terminal position information (latitude/longitude/elevation) and the azimuth information (the direction of the magnetic north and the camera angle), and identifies a restaurant having positional information conforming to the position (it is not necessary to completely conform to the position and an error may be within a predetermined threshold range) from the restaurant information database 41.

In addition to this or instead of this, the CPU 11 may identify a building name from the position of the identified building with reference to the map information database 42 and may identify a restaurant having the building name as a part of an address from the restaurant information database 41.

Subsequently, the CPU 11 identifies a story of the identified restaurant from the story information in the restaurant information database 41 (Step 54).

Subsequently, the CPU 11 extracts identification information of the identified restaurant from the restaurant information database 41 (Step 55). While the identification information is typically the name of the restaurant, in addition to this or instead of this, the genre of the store, the story on which the store exists, or the like may be used as the identification information. The identification information is not limited thereto, and for example, any information may be used if information, such as an image (photograph) representing the appearance or signboard of the store or an image of a representative cuisine of the store, is capable of identifying the store directly or indirectly.

Subsequently, the CPU 11 generates AR information for displaying the extracted identification information at the position of the story of the identified restaurant in the building in the captured image in a superimposed manner (Step 56).

Specifically, the CPU 11 calculates an actual height in a reflected range of the building identified in the captured image by the principle of triangulation, for example, based on the terminal position information (latitude/longitude/elevation), the positional information of the building, and angle information in the azimuth information including average height (eye level) of a user capturing an image from the terminal position. In this case, if the height (eye level) of the user of the user terminal 200 is registered in the restaurant information providing server 100, the user terminal 200, or the like in advance, this information may be taken into consideration. In a case where the entire building is not reflected in the captured image, the CPU 11 calculates the height based on either of an aboveground story portion or a top story portion of the building. In this case, the CPU 11 may calculate the height in consideration of elevation information included in the received terminal position information as well.

Then, the CPU 11 identifies the position (height range) of the identified story of the building in the captured image based on the calculated height of the captured portion of the building, the height of the building in the building information database 43, the height of the identified story, and generates AR information which is set such that the identification information is three-dimensionally displayed on the surface of the building existing at this position in a superimposed manner.

The identification information includes, for example, the name, cuisine genre, or the like of the restaurant, but is not limited thereto.

In a case where it is determined that the story of the restaurant exists in an underground compartment, the CPU 11 calculates a position corresponding to the underground story of the building in the captured image and generates AR information which is set such that the identification information is displayed at this position in a superimposed manner. In this case, the AR information may be generated to be displayed in a different display mode, such as a broken line or semitransparent, for distinction from the AR information of the aboveground story.

Subsequently, the CPU 11 transmits the generated AR information to the user terminal 200 (Step 57).

Subsequently, the CPU 11 determines whether or not a transmission request for detailed store information is received from the user terminal 200 (Step 58).

In a case where the CPU 11 determines that the transmission request for the detailed store information is received (Yes), the CPU 11 extracts detailed information, for example, menu information, location information, recommendation information, and the like from the restaurant information database 41, sets such that the detailed information is AR displayed on the captured image, and transmits the detailed information to the user terminal 200 (Step 59).

In a case where the story on which the identified restaurant exists is divided into a plurality of compartments, the CPU 11 may generate, as AR information, compartment position information indicating the position of a compartment on the story, in which the restaurant exists, as the detailed information with reference to the building information database 43 in distinction from the positions of other compartments and may transmit the compartment position information to the user terminal 200. The compartment position information is generated, for example, in a plan view, but the invention is not limited thereto.

[Operation of User Terminal]

Next, the operation of the user terminal 200 will be described. The operation of the user terminal 200 is executed by cooperation of hardware, such as the CPU 21 and the communication unit 29, and software stored in the storage unit 28. In the following description, for convenience, the CPU 21 is the subject of operation. The CPU 21 can correspond to a control unit (control circuitry) of the embodiments.

Figure 6:
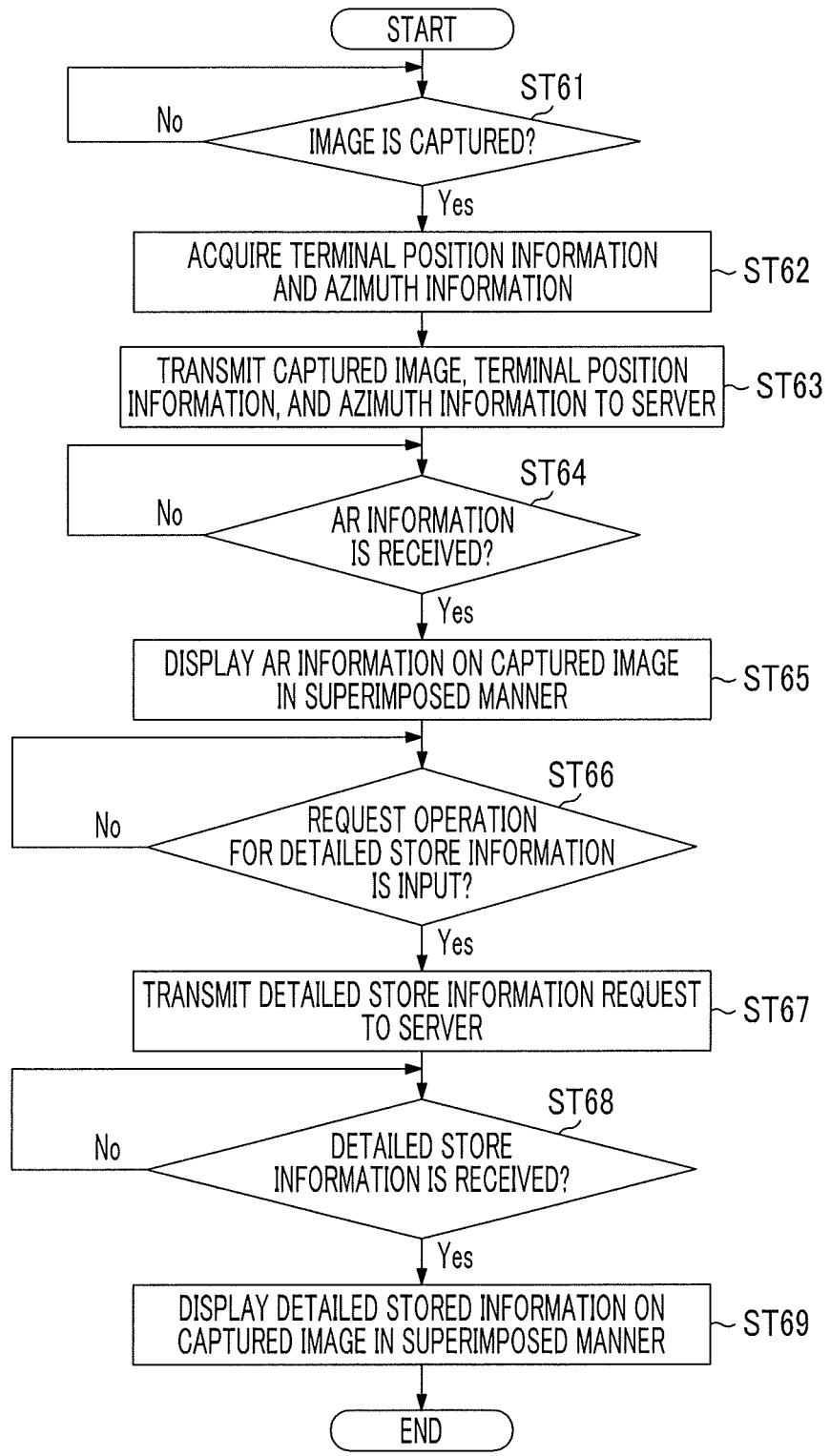
FIG. 6 is a flowchart showing the flow of restaurant information display processing by the user terminal according to the embodiment of the invention.

FIG. 6 is a flowchart showing a flow of restaurant information display processing by the user terminal 200.

As shown in the drawing, the CPU 21 of the user terminal 200 first determines whether or not an image is captured by the camera 30 (Step 61).

In a case where the CPU 21 determines that an image is captured, the CPU 21 acquires terminal position information indicating the position of the user terminal 200 and the azimuth information (the direction of the camera 30 with respect to the magnetic north and the angle of the camera 30) of the user terminal 200 at this time from the positional information acquisition unit 32 and the azimuth information acquisition unit 31 (Step 62).

Subsequently, the CPU 21 transmits the captured image, the terminal position information, and the azimuth information to the restaurant information providing server 100 (Step 63).

Subsequently, the CPU 21 determines whether or not the AR information transmitted through the processing by the restaurant information providing server 100 described in FIG. 5 is received (Step 64).

In a case where the CPU 21 determines that the AR information is received (Yes), the CPU 21 displays the AR information on the captured image on the display unit 26 in a superimposed manner (Step 65).

Subsequently, the CPU 21 determines whether or not a request operation for detailed store information is input for the restaurant information displayed as the AR information (Step 66). The request operation is, for example, an operation to tap the position of the AR information display on the display unit 26 in a superimposed manner or to press the position of the AR information for a long time, but the invention is not limited thereto.

In a case where the CPU 21 determines that the request operation for the detailed store information is input (Yes), the CPU 21 transmits the detailed store information request to the restaurant information providing server 100 (Step 67).

Subsequently, the CPU 21 determines whether or not the detailed store information transmitted from the restaurant information providing server 100 is received in response to the detailed store information request (Step 68), and in a case where the detailed store information is received (Yes), the CPU 21 displays the detailed store information on the captured image on the display unit 26 in a superimposed manner (Step 69).

Figure 7:
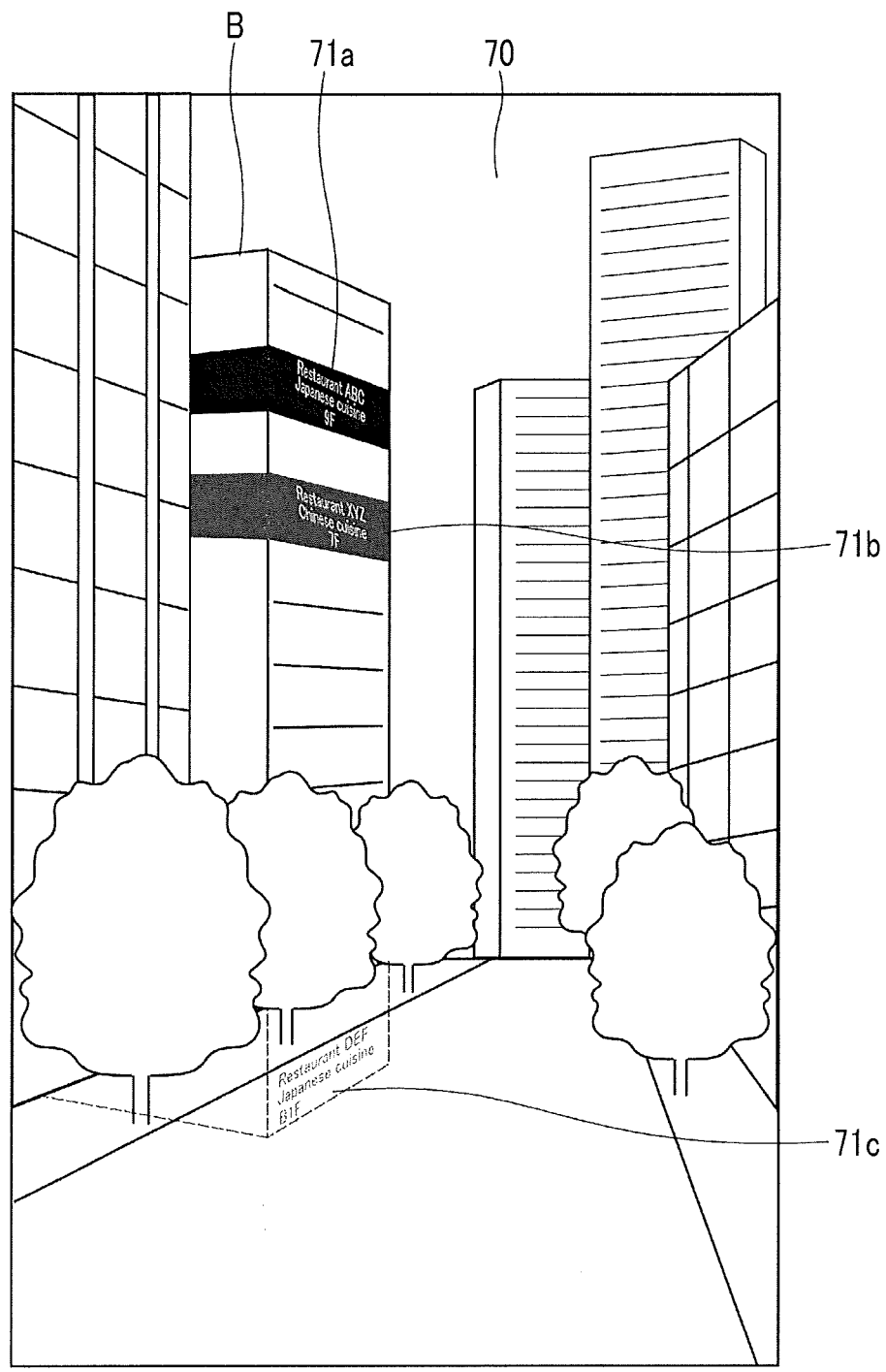
FIG. 7 is a diagram showing an example of restaurant information which is displayed on the user terminal in the embodiment of the invention.

FIG. 7 is a diagram showing an example of AR information on a captured image which is generated by the restaurant information providing server 100 and displayed on the display unit of the user terminal 200.

As shown in the drawing, a building B is included in a captured image 70 captured by the user terminal 200 and a restaurant is identified as existing in the building B by the restaurant information providing server 100. Specifically, for example, a case where restaurants are identified as respectively existing on the seventh story, the ninth story, and the first underground story of the building B is assumed.

In this case, the restaurant information providing server 100 generates AR information 71*a* and 71*b* as identification information of the respective restaurants to be displayed on the surfaces of the positions corresponding to the respective stories of the building B for the restaurants existing on the seventh story and the ninth story as an aboveground story.

As the identification information, the name or cuisine genre of each restaurant, the story on which the restaurant exist, or the like is exemplified. Instead of or in addition to the story, positional information (address) of the restaurant may be included in the identification information. In the example of the drawing, the restaurant existing on the seventh story is called "Restaurant XYZ" and has the cuisine genre of Chinese cuisine, and the restaurant existing on the ninth story is called "Restaurant ABC" and has the cuisine genre of Japanese cuisine. In addition to this or instead of this, for example, an image (photograph) of the appearance or signboard of the restaurant or an image (photograph) of a representative cuisine (menu) of the restaurant may be generated as the identification information, for example, in a thumbnail format.

The AR information 71 may be generated such that the display mode (typically, color) is different according to the cuisine category or the like. In this case, information relating a cuisine genre corresponding to each color may be provided as the AR information as well. In the example of the drawing, the AR information 71*a* of the restaurant belonging to Japanese cuisine is indicated by black, and the AR information 71*b* of the restaurant belonging to Chinese cuisine is indicated by gray. With this, the user can ascertain the genre of the restaurant at first sight.

On the other hand, for the restaurant existing on the first underground story as an underground story, the restaurant information providing server 100 generates AR information 71*c* as restaurant identification information to be displayed on the surface of the position corresponding to the first underground story of the building B on the captured image by a broken line or semi-transparently in a superimposed manner.

In this case, the contents of the identification information are the same as those in a case of the aboveground story. In the example of the drawing, the restaurant existing on the first underground story is called "Restaurant DEF" and has the cuisine genre of Japanese cuisine.

In a case where it is determined that restaurants exist in a plurality of buildings recognized on the captured image, similarly, the AR information is generated for the restaurants of each building.

The restaurant information providing server 100 identifies a plane, on which the AR information is to be displayed in a superimposed manner, and a three-dimensional shape of the plane by analyzing the captured image. Typically, a plane is selected such that the AR information is displayed on the surface having the largest area on the captured image among the recognized buildings in a superimposed manner, but the invention is not limited thereto.

Figure 8:
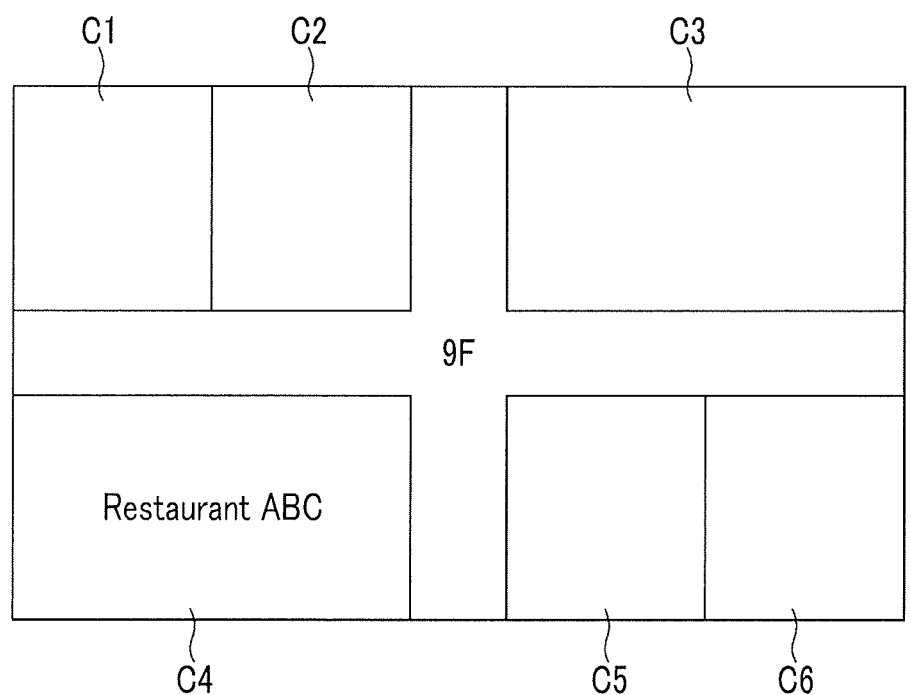
FIG. 8 is a diagram showing an example of detailed restaurant information which is displayed on user terminal in the embodiment of the invention.

FIG. 8 is a diagram showing an example of compartment position information which is displayed as the detailed store information.

As shown in the drawing, for example, in a case where the ninth story, on which "Restaurant ABC" exists, in the building B shown in FIG. 7 is divided into a plurality of compartments (store regions) C1 to C6, the restaurant information providing server 100 generates compartment position information showing a compartment C4, in which "Restaurant ABC" exists, among a plurality of compartments C1 to C6 on the ninth as story detailed store information, for example, in a plan view and displays the compartment position information on the user terminal 200.

CONCLUSION

As described above, according to this embodiment, when displaying the store identification information on a captured image of a building having a plurality of stories as AR in a superimposed manner, the restaurant information providing server 100 allows the user to easily ascertain a story of the building to which the store identification information displayed in a superimposed manner corresponds. Furthermore, with the use of the story information, it is possible to reduce the load of the restaurant information providing server 100 or the user terminal 200 due to the AR information due to the concentration of the AR information on the same place. Since the user receive only the detailed store information of restaurants existing within a range of the captured image from the restaurant information providing server 100, and all directions around the location of the user are not to be searched, it is possible to reduce the load of the restaurant information providing server 100.

Modification Examples

The invention is not limited to only the foregoing embodiment, and may be changed in various ways without departing from the spirit and scope of the present disclosure.

In the foregoing embodiment, although the identification processing of a building and a restaurant in the captured image is executed by the restaurant information providing server 100, the processing may be executed by the user terminal 200. In this case, the user terminal 200 may receive information necessary for the identification processing, such as the restaurant information or the story information, from the restaurant information providing server 100 or other external apparatuses in advance. In this case, the user terminal 200 may be, for example, a wearable terminal such as an HMD. In a case where a building or the like is identified by the user terminal 200, a three-dimensional shape of a stereoscopic object may be ascertained by a depth sensor using a stereo camera (typically, provided in a binocular wearable terminal), an infrared laser or the like in the processing.

In the foregoing embodiment, the restaurant information providing server 100 may acquire the business hours information of the restaurant identified as existing in the building recognized on the captured image 70 from the restaurant information database 41, may determine whether or not the identified time is outside the business hours of the restaurant, and in a case where it is determined that the time is outside the business hours, may perform control such that the AR information for the identification information of the restaurant is not generated. With this, the user is prevented from viewing AR information relating to a restaurant outside the business hours and erroneously visiting the restaurant.

In the foregoing embodiment, the restaurant information providing server 100 may receive, from a terminal of the identified restaurant, congestion information indicating a congestion situation of the restaurant and may generate the AR information in a display mode according to the congestion situation. The display mode is, for example, color, brightness, or the number of some sort of marks or the like, but the invention is not limited thereto. With this, the user can ascertain the congestion situation of the restaurant in the building at first sight.

In the foregoing embodiment, a case where one restaurant exists on each story of the building has been described. However, there may be a case where a plurality of restaurants exist on the same story. In this case, the restaurant information providing server 100 may generate, instead of the AR information shown in FIG. 7, AR information such that a list of restaurants existing on each story is displayed for each story. That is, the AR information of the restaurant in a case where a plurality of restaurants exist on a story on which a identified restaurant exits is different from the AR information of the restaurant in a case where one restaurant exists on a story on which a identified restaurant exists. Furthermore, though not shown, one of restaurants having a stripe shape including the colors of respective genres of a plurality of restaurants may be generated as AR information. In this case, the restaurants having a stripe shape may be selected by an operation, such as tapping, and AR information may be generated such that information of each of a plurality of restaurants included in the restaurants having a stripe shape is displayed. With this, the user can also easily recognize composite facilities.

In the foregoing embodiment, an example where the AR information as the identification information of the restaurant is displayed with no user's operation on the captured image has been described. However, in a case where multiple restaurants exist in a building on one captured image, if multiple pieces of AR information are displayed at one time, the user may feel bothering. Accordingly, text information or the like may not be initially displayed as AR information in a superimposed manner, for example, a surface of a story, on which a restaurant exits, in each building is filled with a predetermined color or a mark, such as a predetermined icon, may be displayed at the position thereof, and the restaurant information providing server 100 may generate AR information such that, in a case where the user performs an operation to tap the position, or the like, identification information (text information or the like) of a restaurant corresponding to the position is displayed in a superimposed manner.

In the foregoing embodiment, although an example where the restaurant information is displayed as the AR information has been described, identification information of a store (establishment or place of business) (sale store or service providing facility) other than a restaurant may be generated and displayed as AR information as in the foregoing embodiments.

What is claimed is:

1. An information processing apparatus comprising:
a storage configured to store establishment information including identification information of an establishment, establishment position information indicating a position of the establishment, and level information indicating a level, on which the establishment is located, in a building, having a plurality of levels, in which the establishment exists;
communication circuitry configured to receive, from a user terminal, a captured image captured by the user terminal, azimuth information indicating an azimuth of imaging, and terminal position information indicating a position of the user terminal; and control circuitry configured to identify at least one establishment existing in the building included in the received captured image based on the received terminal position information and azimuth information and the stored establishment position information, identify a position of a level, on which the identified establishment exists, in the captured image based on the level information, generate display information for displaying the identification information of the identified establishment on the position of the identified level of the captured image in a superimposed manner, and perform control such that the communication circuitry transmits the generated display information to the user terminal.

2. The information processing apparatus according to claim 1, wherein the communication circuitry receives height information of a user or elevation information included in the terminal position information from the user terminal, and wherein an actual height in a reflected range of the building identified in the captured image is calculated using the height information or the elevation information.

3. The information processing apparatus according to claim 2, wherein, in a case where the entire building is not reflected in the captured image, the control circuitry calculates the actual height in the reflected range of the building based on at least one of an aboveground level portion or a top level portion of the building.

4. The information processing apparatus according to claim 1, wherein the level information includes aboveground level information and underground level information, and wherein the control circuitry generates display information for displaying the identification information of an establishment identified as existing on an underground level by the underground level information in a display form different from display information for displaying the identification information of an establishment identified as existing on an aboveground level by the aboveground level information.

5. The information processing apparatus according to claim 1, wherein the control circuitry adds information indicating the position or level of the establishment to the display information.

6. The information processing apparatus according to claim 1, wherein the storage stores building compartment information relating to compartments on each level of the building, and wherein the control circuitry generates compartment position information indicating the position of a compartment of the establishment on the level, on which the identified establishment exists, in distinction from the positions of other compartments as the display information based on the stored building compartment information.

7. The information processing apparatus according to claim 1, wherein the control circuitry utilizes a first display form of the identification information of the establishment in a case where a plurality of establishments exist on the level, on which the identified establishment exists, different from a second display form of the identification information of the establishment in a case where one establishment exists on the level, on which the identified establishment exists.

8. The information processing apparatus according to claim 1, wherein the establishment information includes genre information indicating a genre of the establishment, and wherein the control circuitry generates the display information in a color according to the genre of the identified establishment.

9. The information processing apparatus according to claim 8, wherein the control circuitry generates display information including establishment information other than the genre of the establishment in response to a request from the user terminal.

10. The information processing apparatus according to claim 8, wherein, in a case where a plurality of establishments exist on the level, on which the identified establishment exists, the control circuitry generates the display information including all colors according to the respective genres of the plurality of establishments.

11. The information processing apparatus according to claim 1, wherein the establishment information includes business hours information indicating business hours of the establishment, and wherein the control circuitry determines whether or not a time at which the establishment is identified is outside the business hours of the identified establishment based on the business hours information, and in a case where it is determined that the time is outside the business hours, excludes the display information for the identification information of the establishment.

12. The information processing apparatus according to claim 1, wherein the communication circuitry receives congestion information indicating a congestion situation of the establishment from the establishment, and the control circuitry generates the display information in a display form according to the received congestion situation of the identified establishment.

13. A terminal apparatus mountable on a user comprising:

imaging circuitry;

an azimuth sensor configured to acquire azimuth information indicating an imaging direction of the imaging circuitry;

position acquisition circuitry configured to acquire terminal position information indicating a position of the terminal apparatus;

communication circuitry configured to perform communication with a server apparatus;

a display; and control circuitry configured to perform control such that the communication circuitry transmits a captured image captured by the imaging circuitry, the azimuth information acquired by the azimuth sensor, and the terminal position information acquired by the position acquisition circuitry to the server apparatus, perform control such that the communication circuitry receives display information for displaying identification information of an establishment identified as existing on a specific level of a building included in the captured image on a position of the specific level of the captured image in a superimposed manner based on the captured image, the azimuth information, and the terminal position information from the server apparatus, and perform control such that the display displays the received display information on the captured image in a superimposed manner.

14. An information processing method comprising:

storing establishment information including identification information of an establishment, establishment position information indicating the position of the establishment, and level information indicating a level, on which the establishment is located, in a building, having a plurality of levels, in which the establishment exists;

receiving, from a user terminal, a captured image captured by the user terminal, azimuth information indicating an azimuth of imaging, and terminal position information indicating a position of the user terminal;

identifying at least one establishment existing in the building included in the received captured image based on the received terminal position information and azimuth information and the stored establishment position information;

identifying the position of a level, on which the identified establishment exists, in the captured image based on the level information, generating display information for displaying the identification information of the identified establishment on the position of the identified level of the captured image in a superimposed manner; and transmitting the generated display information to the user terminal.

15. A non-transitory computer-readable storage medium storing a program, the program when executed causing an information processing apparatus to implement a method comprising:

storing establishment information including identification information of an establishment, establishment position information indicating a position of the establishment, and level information indicating a level, on which the establishment is located, in a building, having a plurality of levels, in which the establishment exists;

receiving, from a user terminal, a captured image captured by the user terminal, azimuth information indicating an azimuth of imaging, and terminal position information indicating a position of the user terminal;

identifying at least one establishment existing in the building included in the received captured image based on the received terminal position information and azimuth information and the stored establishment position information;

identifying a position of a level, on which the identified establishment exists, in the captured image based on the level information;

generating display information for displaying the identification information of the identified establishment on the position of the identified level of the captured image in a superimposed manner; and transmitting the generated display information to the user terminal.

* * * * *